W. R. MORAN.
AUTOMOBILE ALARM.
APPLICATION FILED AUG. 4, 1919.
1,345,387.   Patented July 6, 1920.
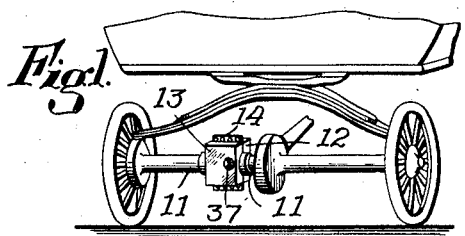
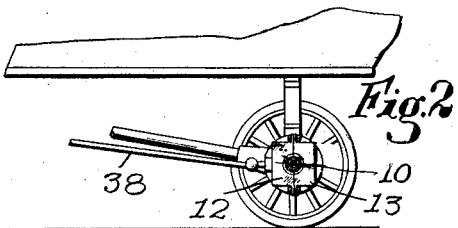
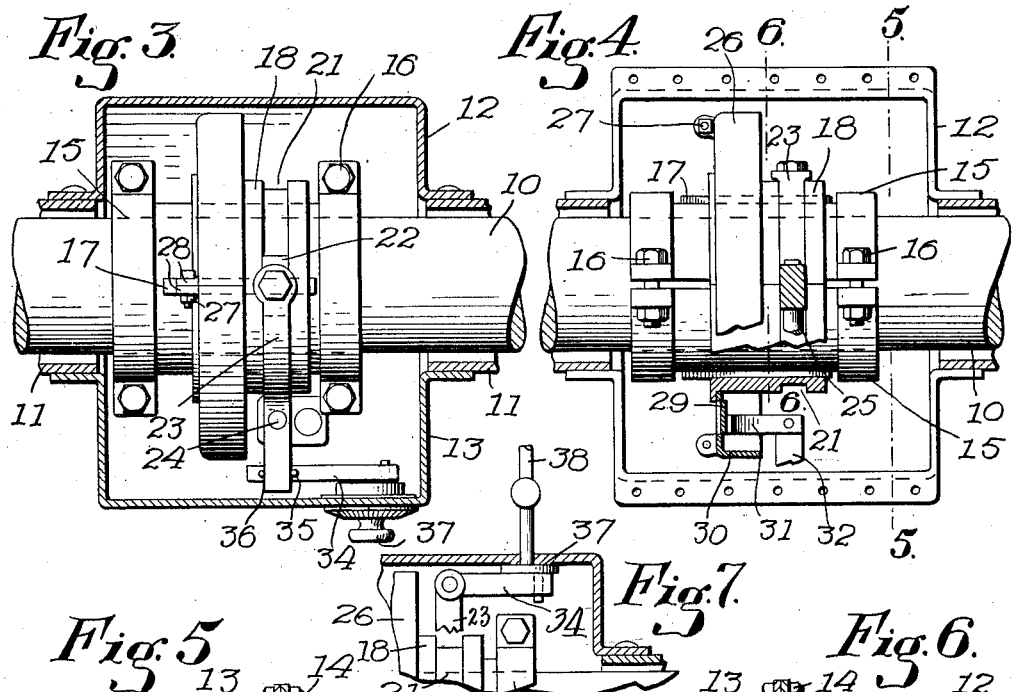
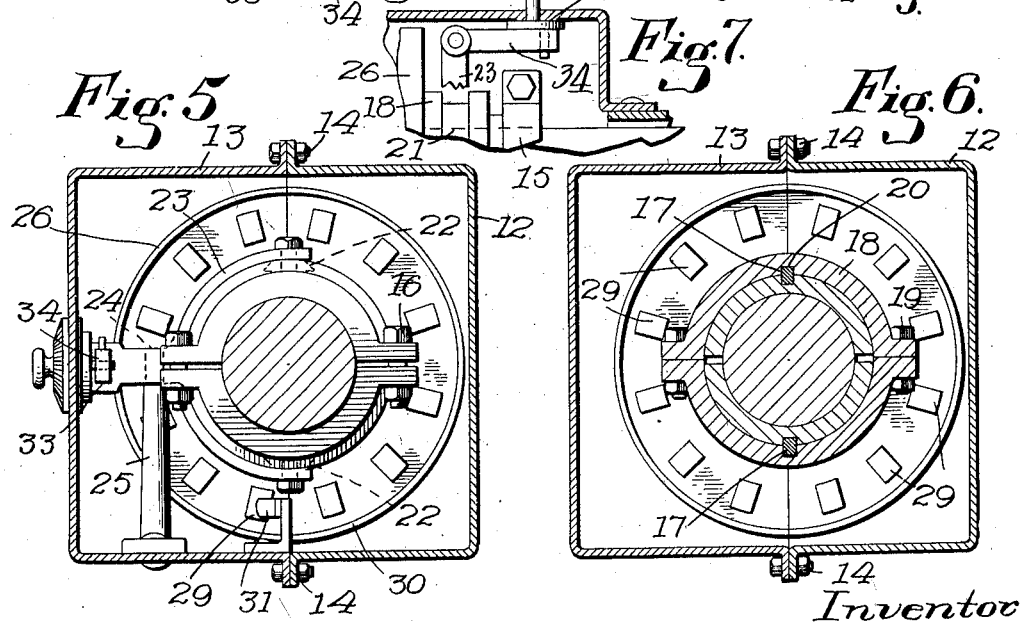
Inventor
Walter R. Moran.
By Attorneys.

UNITED STATES PATENT OFFICE.

WALTER R. MORAN, OF WORCESTER, MASSACHUSETTS, ASSIGNOR OF ONE-HALF TO ALEXANDER GOLDSTEIN, OF WORCESTER, MASSACHUSETTS.

AUTOMOBILE-ALARM.

1,345,387.　　　　　Specification of Letters Patent.　　Patented July 6, 1920.

Application filed August 4, 1919. Serial No. 315,337.

*To all whom it may concern:*

Be it known that I, WALTER R. MORAN, a citizen of the United States, residing at Worcester, in the county of Worcester and State of Massachusetts, have invented a new and useful Automobile - Alarm, of which the following is a specification.

This invention relates to an audible alarm designed to prevent theft of automobiles equipped therewith.

It is the object of my invention to provide a device of this character which may be rendered operative or inoperative as desired by a person having the key or combination of the lock which controls the device and which cannot be changed in condition by any other person.

In the preferred form of my invention, the alarm comprises a sound - producing member mounted for continuous rotation while the car is in motion, a device coöperating therewith to sound an alarm and lock-controlled means to bring said member and said device into operative relation when desired by the car owner or authorized operator.

My invention further relates to arrangements and combinations of parts which will be hereinafter described and more particularly pointed out in the appended claims.

A preferred form of my invention and a slight modification are shown in the drawings, in which—

Figure 1 is a partial rear view of an automobile with my alarm applied thereto;

Fig. 2 is a side elevation of the alarm, also showing provision for distant control;

Fig. 3 is a horizontal sectional view of the alarm;

Fig. 4 is a vertical sectional view thereof;

Figs. 5 and 6 are transverse sectional elevations taken along the lines 5—5 and 6—6 in Fig. 4; and Fig. 7 is a partial sectional elevation of a modification.

Referring to the drawings, I have shown my improved alarm applied to the rear axle of an automobile, although this particular location of the alarm is not always essential. The rear axle is indicated at 10 and the usual fixed axle housing is indicated at 11. When my alarm is to be mounted on the rear axle, it is necessary to remove a short section of the housing, as indicated in Figs. 3 and 4, and to firmly connect the separated parts by a strong metal casing formed in two sections 12 and 13. One section 12 of the casing should be firmly riveted to the two parts of the housing and the other section 13 may be connected to the section 12 and to the housing 11 by a plurality of bolts 14 or in any other suitable manner, as by one or more locks. The ends of these bolts may be upset or riveted to render the opening of the casing as difficult as may be desired.

In applying the movable part of the alarm to the rotatable axle 10, I preferably use two half sleeves 15 which may be clamped about the axle 10 by clamping bolts 16 (Fig. 4). The portion of the sleeve between the end flanges is cylindrical in section and is preferably provided with one or more keys 17 (Fig. 6).

A two-part collar or hub 18 held together by bolts 19 is slidably mounted upon the sleeve 15, and is provided with keyways 20 fitting the keys 17. The hub 18 is also provided with a circumferential groove 21 adapted to receive shoes 22 pivotally mounted upon the forked ends of a yoke 23, pivoted at 24 to a stud 25 fixed in the casing member 13.

A resonant disk 26 is clamped upon the collar or hub 18 and is rotatable therewith. The disk 26 is preferably formed in half sections clamped together about the hub 18 by bolts 27 extending through ears 28 on the back of the disk. The radial wall of the disk has a plurality of lugs or projections partially severed therefrom and bent forward to form teeth 29 as shown in the lower portion of Fig. 4.

The disk 26 is also provided with a circumferential flange 30 which increases its stiffness and also improves the sound-producing qualities thereof.

When the disk 26 is moved to the right, as viewed in Fig. 4, the teeth 29 engage a flat spring or other device 31 mounted upon a bracket 32 fixed to the casing member 13. The axial position of the disk 26 is determined by the yoke 23 previously described, which may be provided with an opening 33 (Fig. 5) through which a bolt 34 (Fig. 3) may extend. Pins 35 and 36 on each side of the yoke prevent longitudinal movement of the bolt 34 through the opening 33.

The position of the bolt 34 is determined by any suitable lock-controlled mechanism, the bolt being shown herein as controlled by a combination lock 37 which may be of any usual type, the specific mechanism of the lock forming no part of my invention. The lock may be placed at the rear side of the casing, as indicated in Fig. 3, for direct manual operation or it may be placed at the front side of the casing, as indicated in Fig. 7, being then connected to the opposite end of the yoke 23 and having a rod 38 extended so that the combination head may be conveniently located within the body of the automobile.

Having thus described the details of construction of my invention, the operation is easily understood. When the car is to be protected, the lock 37 is manipulated so as to slide the disk 26 to the right as viewed in Figs. 3 and 4, bringing the teeth 29 in position to engage the spring-plate 31. If the car is started with the parts in this position, a loud alarm will be sounded by the engagement of the teeth 29 with the plate 31, the sound being increased by the resonant construction of the disk 26 and also by the rigid connection of the spring 31 with the casing 13 which acts as a sounding box. It is impossible to remove the disk 26 from position to engage the spring 31 except by the lock 37.

The formation of the circular parts of the apparatus in sections enables me to apply the device to a rear axle without removing the same or performing mechanical operations thereon.

Having thus described my invention it will be evident that changes and modifications may be made therein by those skilled in the art without departing from the scope of my invention as set forth in the claims; and I do not wish to be otherwise limited to the details herein disclosed, but what I claim is:—

1. An automobile alarm having in combination a casing, a resonant member mounted therein and continuously rotated while the car is in motion, a device effective to directly engage said member to sound an alarm, and manually controlled means to effect relatively bodily movement of said device and said member to render said device inoperative or to cause positive coöperative engagement thereof with said member.

2. In an automobile having a fixed rear axle housing and an axle rotatable therein, in combination, a casing rigidly supported on said housing, a disk mounted to rotate with said axle in said casing and having a plurality of projections on one face thereof, a stationary device adapted to be directly and positively engaged by said projections, a lock, and lock-controlled means to effect direct and positive operative engagement of said disk and said device to thereby sound an alarm.

3. An automobile alarm having, in combination, a resonant disk having a plurality of projections thereon, a member effective to directly and positively engage said projections, means to rotate one of said parts about the axis of said disk and locking means to cause coöperative engagement of said parts to sound an alarm.

In testimony whereof I have hereunto affixed my signature.

WALTER R. MORAN.